US012673375B2

(12) United States Patent
Butschan

(10) Patent No.: US 12,673,375 B2
(45) Date of Patent: Jul. 7, 2026

(54) DENTAL MILLING MACHINE, ADAPTER FOR USE IN A DENTAL MILLING MACHINE, AND METHOD FOR SETTING UP A DENTAL MILLING MACHINE

(71) Applicant: vhf camfacture Aktiengesellschaft, Ammerbuch (DE)

(72) Inventor: Jens Butschan, Ostfildern (DE)

(73) Assignee: vhf camfacture Aktiengesellschaft, Ammerbuch (DE)

( * ) Notice: Subject to any disclaimer, the term of this patent is extended or adjusted under 35 U.S.C. 154(b) by 686 days.

(21) Appl. No.: 18/069,353

(22) Filed: Dec. 21, 2022

(65) Prior Publication Data

US 2023/0201933 A1     Jun. 29, 2023

(30) Foreign Application Priority Data

Dec. 23, 2021    (EP) .................................... 21217580

(51) Int. Cl.
| | |
|---|---|
| *A61C 13/34* | (2006.01) |
| *A61C 13/12* | (2006.01) |
| *B23C 3/00* | (2006.01) |
| *B23C 3/34* | (2006.01) |
| *B23C 9/00* | (2006.01) |
| *B23Q 3/06* | (2006.01) |
| *A61C 13/00* | (2006.01) |
| *B23Q 1/52* | (2006.01) |
| *B23Q 7/14* | (2006.01) |

(52) U.S. Cl.
CPC ............... *B23C 3/34* (2013.01); *A61C 13/12* (2013.01); *B23C 9/00* (2013.01); *A61C 13/0022* (2013.01); *B23C 2220/36* (2013.01); *B23Q 1/525* (2013.01); *B23Q 7/1426*

(2013.01); *Y10T 409/303752* (2015.01); *Y10T 409/305824* (2015.01); *Y10T 409/309016* (2015.01)

(58) Field of Classification Search
CPC ................ A61C 13/0022; B23Q 3/062; Y10T 409/303752–303808
USPC .................................................. 409/131–132
See application file for complete search history.

(56) References Cited

U.S. PATENT DOCUMENTS

| | | | |
|---|---|---|---|
| 2010/0310786 A1* | 12/2010 | Dunne ............... | A61C 13/0018 427/595 |
| 2014/0080094 A1 | 3/2014 | Howe | |
| 2014/0147225 A1 | 5/2014 | Cornell et al. | |
| 2015/0216638 A1 | 8/2015 | Baaske et al. | |

FOREIGN PATENT DOCUMENTS

| | | | |
|---|---|---|---|
| CN | 202665727 U | * | 1/2013 |
| DE | 202013103515 U1 | | 9/2013 |
| EP | 0455854 A1 | | 11/1991 |
| WO | 2009073498 A1 | | 6/2009 |

OTHER PUBLICATIONS

Machine Translation of CN 202665727 U, which CN '727 was published Jan. 16, 2013.*

* cited by examiner

*Primary Examiner* — Erica E Cadugan
(74) *Attorney, Agent, or Firm* — Smartpat PLC

(57) ABSTRACT

A dental milling machine includes a workpiece holder. The workpiece holder (10) has a bracket (11) and an adapter (12, 12'). The adapter (12, 12') is mounted on the bracket (11). In a first state (17), the adapter (12, 12') is a semimanufacture (16, 16') and designed to be milled by the dental milling machine (1).

8 Claims, 6 Drawing Sheets

DENTAL MILLING MACHINE, ADAPTER FOR USE IN A DENTAL MILLING MACHINE, AND METHOD FOR SETTING UP A DENTAL MILLING MACHINE

CROSS-REFERENCE TO RELATED APPLICATION

This application claims the benefit of European Patent Application No. EP 21217580.6, filed 2021 Dec. 23, the contents of which is incorporated by reference in its entirety.

TECHNICAL FIELD

The disclosure relates to a dental milling machine and to an adapter for use in a dental milling machine. Furthermore, the disclosure relates to a method for setting up a dental milling machine.

BACKGROUND

For the production of dental prostheses, e.g. crowns, bridges, and the like, blanks made of various materials are machined in dental milling machines. Such blanks are typically standardized with regard to their dimensions so that they can be used in different dental milling machines across systems. In the meantime, manufacturers are starting to sell dental milling machines that can only accommodate blanks with dimensions that deviate from the standard. Thus, users are dependent on the use of the blanks associated with the dental milling machine. Flexible use of the dental milling machine is no longer possible.

If a blank is clamped in the workpiece holder for machining during the intended operation of the dental milling machine, it must be ensured before machining begins that the coordinate system of the real workpiece, in this case the blank, matches the coordinate system of the programmed, virtual workpiece. This requires calibration of the workpiece holder before initial operation of the dental milling machine.

Dental milling machines are known where a test workpiece with several reference points is clamped in the workpiece holder for calibration. The reference points are approached by a probe clamped in the tool holder. The coordinates recorded at the reference points are stored in the control system of the dental milling machine. Based on these reference points, the virtual coordinate system of the workpiece holder and thus of the workpiece as well is adjusted. In a further calibration step, a reference workpiece is milled whose target geometry is stored in the control system of the dental milling machine. The geometry of the reference workpiece is measured and compared with the target geometry. Based on the deviation of actual geometry and target geometry of the reference workpiece, a correction of the virtual coordinate system can be made. This step can be repeated until the reference workpiece is manufactured with sufficient accuracy. Such calibration of the dental milling machine is extremely time-consuming and expensive. Due to the complexity of calibration, it usually has to be performed by service technicians.

SUMMARY

The disclosure is based on the task of improving a dental milling machine in such a way that the dental milling machine can be set up in a simple manner and, at the same time, used flexibly.

The task regarding the dental milling machine is solved by a dental milling machine as claimed.

The disclosure is based on the further task of providing simple installation and, at the same time, flexible use of a dental milling machine.

The task is solved by an adapter for use in a dental milling machine as claimed.

The disclosure is based on the additional task of providing a method that enables simple setup and, at the same time, flexible use of a dental milling machine.

The task with respect to the method is solved by a method as claimed.

The dental milling machine includes a workpiece holder. The workpiece holder has a bracket and an adapter. The adapter is mounted on the bracket. The adapter has at least one first holder for attaching to the bracket of the dental milling machine. In a first state, the adapter is a semimanufacture and designed to be milled by the dental milling machine.

Before the initial operation of the workpiece holder, the adapter is milled and thereby obtains the contour intended for holding a blank. For example, the operator can provide the appropriate milling operation depending on the blanks to be machined, thus achieving the desired contour on the adapter. Accordingly, any contour adapted to the operator's wishes can be provided on the adapter, which is adapted to the blanks used by the operator. Consequently, the dental milling machine is not limited to machining specific blanks but can be used for a wide range of blanks.

A further advantage of the dental milling machine according to the invention is that additional calibration of the dental milling machine is not required due to the milling of the adapter. The contour for holding the workpiece is milled into the adapter, which determines the position of the workpiece holder in the dental milling machine. The control system of the dental milling machine knows the exact position of the workpiece holder, since this corresponds to the position of the contour programmed for the milling operation. When the adapter is milled, the inaccuracies of the dental milling machine are transferred to the adapter, causing the zero points of the workpiece holder and the dental milling machine to be aligned relative to each other.

In a second state the adapter has been milled by the dental milling machine and includes a contour for receiving a blank. Accordingly, in the second state of the adapter, a workpiece can be received in the workpiece holder.

Preferably, the adapter is made of plastic, especially injection molded. The adapter has sufficient strength in plastic to be able to hold workpieces in it during the milling operation. At the same time, plastic is much easier to mill than alternative materials that would be suitable for such an adapter, such as aluminum or other metallic materials. The bracket is preferably made of aluminum.

In particular, the adapter is detachably held on the bracket. An adapter with an individual contour for holding a blank can be provided for each holding contour of that blank. If multiple blanks are to be machined in the dental milling machine and their mounting contours are different, the adapter can be easily changed and the corresponding blank machined.

The workpiece holder has at least one clamping device. The clamping device is preferably held on the adapter. When the blank is clamped in the workpiece holder, the blank is lying on the adapter and is clamped against the adapter by the clamping device.

In its first state, the adapter is preferably arc-shaped. The commercially available blanks are circular and disc shaped.

In its second state, the adapter has a contour at least partially inverse to the blank, preferably also arc-shaped, especially semicircular. To enable rapid milling, the contour of the adapter in its first state is approximated to the contour in its second state. However, it may also be expedient to provide a different contour for the adapter in its first state. This could be the case, for example, if differently shaped workpieces, such as polygonal workpieces or the like, are to be held on the adapter. It is preferably provided that the bracket has at least one lateral stop for attachment of the adapter. When an adapter is changed, it is pushed to the stop and then screwed down. This can ensure sufficiently accurate positioning of the adapter. It is advantageous that the bracket and the adapter are aligned with each other via a dowel pin.

The method of setting up a dental milling machine according to the invention provides a dental milling machine, wherein the dental milling machine has a workpiece holder, wherein the workpiece holder includes a bracket and an adapter, wherein the adapter is fixed on the bracket. The adapter is a semimanufacture and is milled by the dental milling machine in such a way that a receiving contour is formed on the adapter for receiving a blank.

Preferably, at least one clamping device is attached to the adapter. In particular, the clamping device is mounted on the adapter after the adapter has been milled. When machining a blank, the blank is held between the adapter and the at least one clamping device.

Further features of the invention are apparent from the description and the drawings, in which an example of an embodiment of the invention, described in detail, is illustrated.

DETAILED DESCRIPTION

Figure 1:
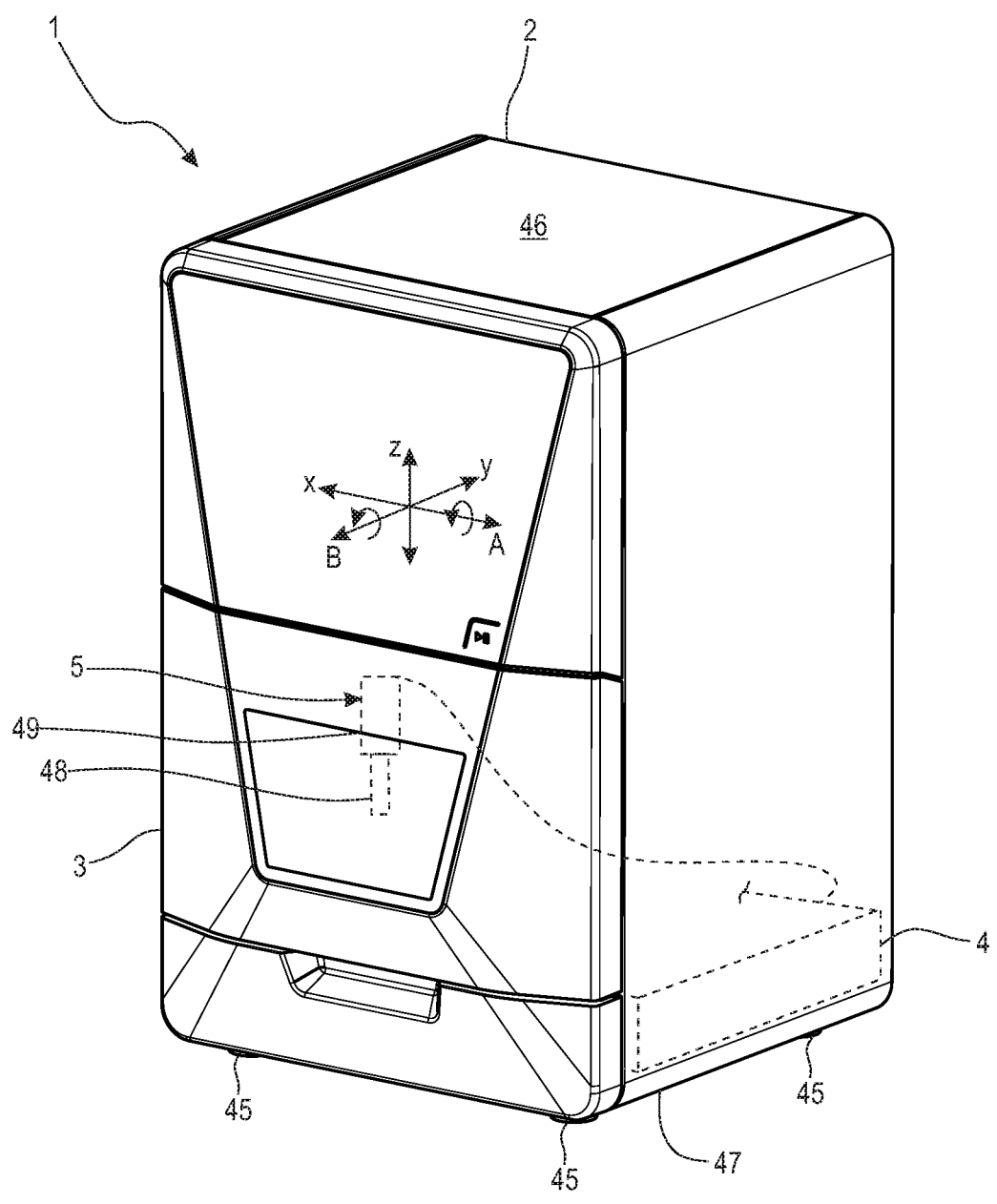
FIG. 1 is a perspective view of a dental milling machine.

FIG. 1 illustrates a dental milling machine 1. The dental milling machine 1 is intended for the production of dental prostheses, in particular for the production of crowns and bridges. Such a dental prosthesis is manufactured from a blank 15. The dental milling machine 1 has a housing 2 with a loading flap 3. The housing 2 delimits an interior 9 of the dental milling machine 1. After opening the loading flap 3, access to the interior 9 of the dental milling machine 1 is open so that, for example, a blank 15 can be inserted or removed. The housing 2 of the dental milling machine has a top side 46 and a bottom side 47. Several feet 45 are arranged on the bottom side 47 of the dental milling machine 1, wherein the dental milling machine 1 is placed on its feet 45. The term "top" indicates a direction running from bottom side 47 to top side 46 of the dental milling machine 1. The term "bottom" refers to a direction extending from the top side 46 to the bottom side 47 of the dental milling machine 1.

As shown schematically in FIG. 1, a milling spindle 5 is arranged in the dental milling machine 1. The milling spindle 5 includes an electric motor 49 and a spindle 48 driven by the electric motor 49. In the embodiment example, the milling spindle 5 can be adjusted in space translationally, i.e. in the direction of the x, y and z-axes of the dental milling machine 1, via a drive system that is not illustrated in greater detail. In the preferred embodiment, the milling spindle 5 is preferably rotationally adjustable and can be swiveled about degrees of freedom A and B, i.e. about the x-axis and the y-axis, respectively. The degrees of freedom of the milling spindle are schematically illustrated in FIG. 1. Furthermore, the dental milling machine 1 includes a control device 4, which is only illustrated schematically in FIG. 1. The control device 4 is used for electrical supply and control of the milling spindle 5, as well as the drive system. The milling spindle 5 and the drive system are connected to the control device 4, in particular via an electrical connection.

Figure 2:
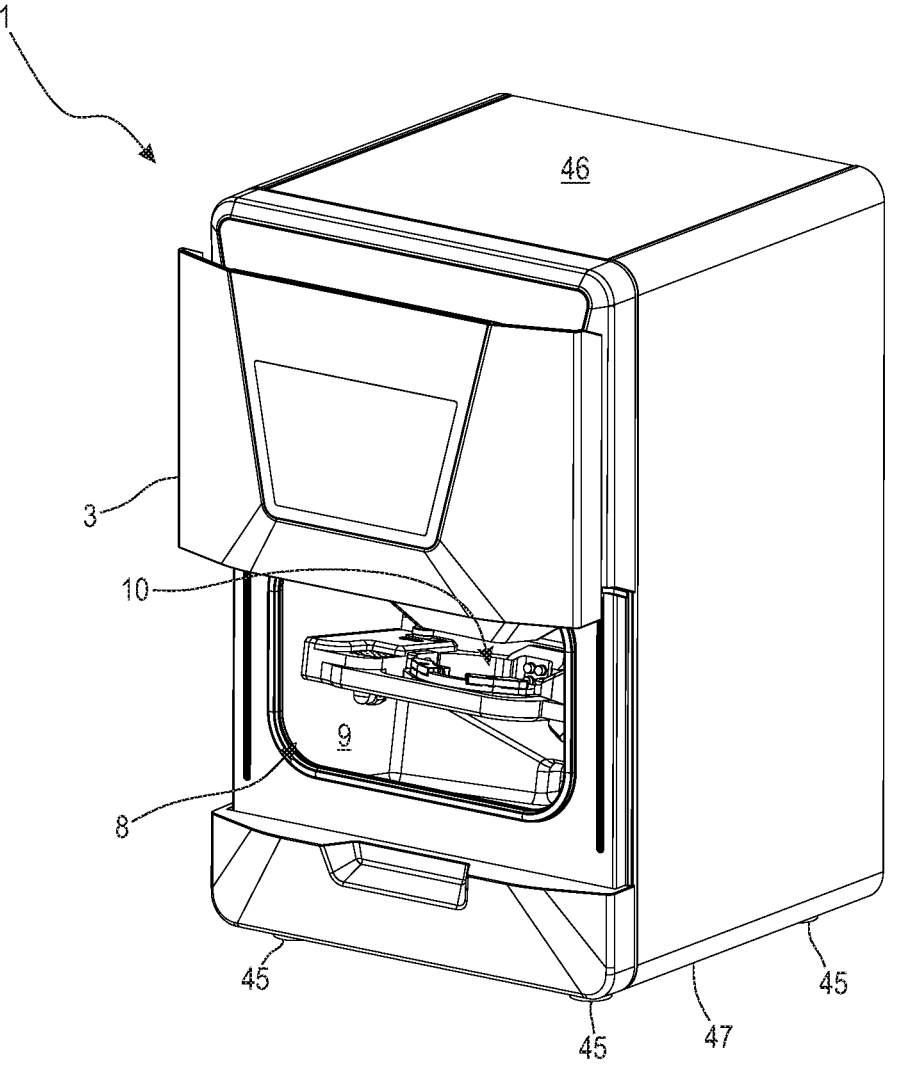
FIG. 2 is a perspective view of the dental milling machine according to FIG. 1 with an opened loading flap.

FIG. 2 illustrates the dental milling machine 1 with opened loading flap 3. The opened loading flap 3 provides access to a loading opening 8. Blanks 15 can be guided through the loading opening 8 into the interior 9 of the dental milling machine 1 and inserted into a workpiece holder 10 of the dental milling machine 1. As illustrated in FIG. 1, the workpiece holder 10 is arranged in the interior 9 of the dental milling machine 1. The workpiece holder 10 is used to hold a blank 15 and to fix it in such a way that an unwanted displacement of the blank 15 can be prevented during machining of the blank 15. This enables precise machining of the blank 15.

Figures 3, 4, 5, 6:
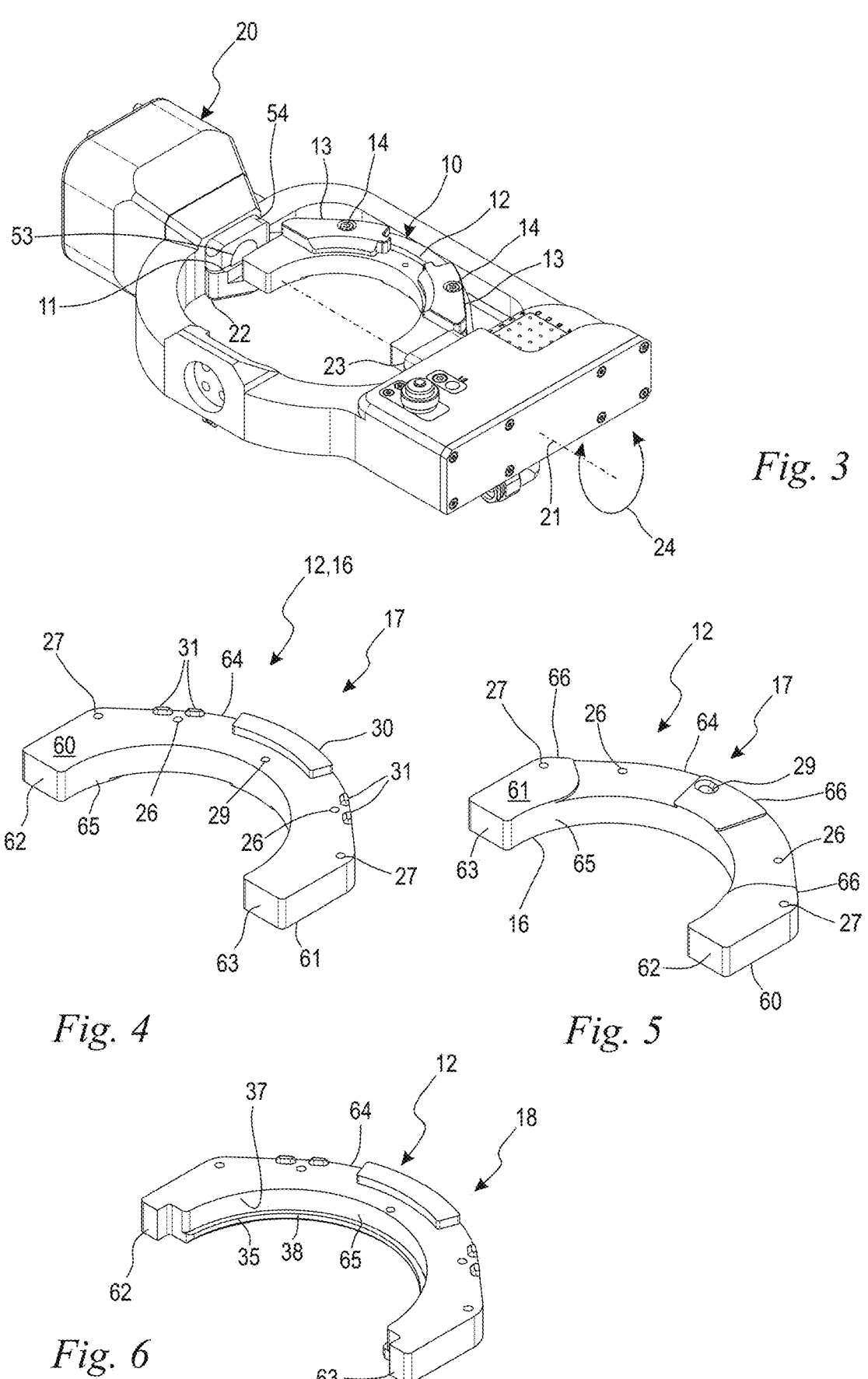
FIG. 3 is a perspective view of an assembly of a carrier and a workpiece holder with an adapter.
FIG. 4 is a perspective top view of an adapter as a semimanufacture for the workpiece holder.
FIG. 5 is a perspective bottom view of the adapter according to FIG. 4.
FIG. 6 is a perspective view of the adapter in milled condition.
Figure 7:
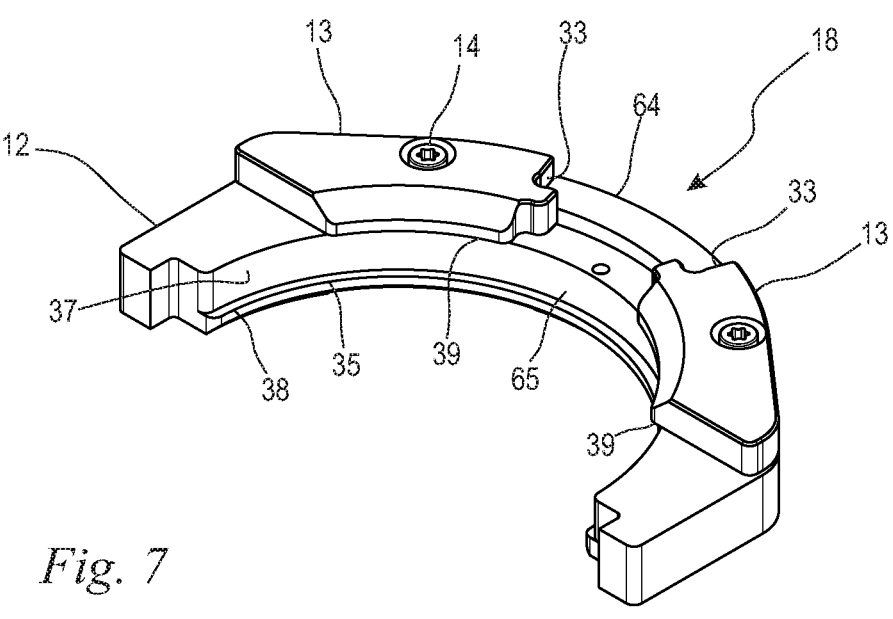
FIG. 7 is a perspective view of the adapter according to FIG. 6 with clamping devices.

As illustrated in FIG. 3, the workpiece holder 10 is held on a carrier 20 of the dental milling machine 1. In the preferred embodiment, the workpiece holder 10 is held on the carrier 20 so as to be able to swivel about a swivel axis 21. The workpiece holder 10 extends from its first end 22 to its second end 23. The workpiece holder 10 is swivel-mounted at its two ends 22, 23 on the carrier 20. The workpiece holder 10 is operatively connected to an electric motor, particularly a stepper motor, which is not illustrated. This electric motor effects a swiveling movement 24 of the workpiece holder 10 about the swivel axis 21.

As illustrated in FIG. 3, the workpiece holder 10 includes a bracket 11 and an adapter 12. The adapter 12 is arranged on the bracket 11. The workpiece holder 10 has at least one clamping device 13. In the present embodiment, two clamping devices 13 are provided. The clamping devices 13 are designed to clamp the blank 15 against the adapter 12. Here, the blank 15 preferably is held directly between the adapter 12 and the clamping device 13. It is also possible to provide only one clamping device 13, or even more than two clamping devices 13. The clamping devices 13 are preferably mounted on the adapter 12. Alternatively, the clamping devices 13 can also be mounted on the bracket 11. A screw connection 14 is provided for fastening each clamping device 13. Alternatively, in one embodiment of the dental milling machine 1, it may be expedient to design the clamping device 13 so that it can be attached to the adapter 12 or the bracket 11 without the use of tools. In such an embodiment, the clamping device 13 can be attached by means of a quick release, an eccentric lever, or the like.

FIG. 4 illustrates the adapter 12. The adapter 12 is formed as a semimanufacture 16 and is thus in a first state 17. In this first state 17, the adapter 12 has not yet been milled by the dental milling machine 1. The adapter 12 is preferably formed of a plastic material. It may be expedient to produce the adapter by injection molding. The cutting forces that occur when milling plastic are significantly lower than those for a metallic material. The adapter 12 extends from its first end side 62 to its second end side 63. In the present embodiment, the adapter 12 is arc-shaped, wherein the concave-shaped side of the adapter 12 is an inner side 65 and the convex-shaped side of the adapter 12 is an outer side 64. Furthermore, the adapter 12 includes a top side 60 and a bottom side 61 connected to each other by end sides 62, 63, the inner side 65, and the outer side 64.

As FIG. 4 illustrates, in the preferred embodiment, the semimanufacture 16 is in the form of a semi-finished product and has several prefabricated openings 26, 27, 29, as well as functional contours 30, 31. Thus, the adapter 12 has at least one opening 27 through which the adapter 12 can be screwed to the bracket 11 at its bottom side 61. Thus, the bottom side 61 forms a holder 66 for the connection to the bracket 11. An internal thread, not illustrated in greater detail, is provided in the opening 27. In the preferred embodiment, the internal thread is a threaded sleeve over-molded into the semimanufacture 16. In the present embodiment, three such openings 27 are provided for connection to the bracket 11. A different number of openings 27 may also be expedient. In addition, the adapter 12 has two further openings 26, each with a thread, via which clamping devices 13 can be attached to the top side 60 of the adapter 12.

As illustrated in FIG. 4, positioning elements 31 are provided on the top side 60 of the adapter 12, on which the clamping device 13 is placed when the workpiece holder 10 is mounted. Furthermore, a center crosspiece 30 is formed on the top side 60 of the adapter 12, at the ends of each of which a clamping device 13 comes to be positioned. When the clamping device 13 is attached to the adapter 12, it is placed on the positioning elements 31 and at least partially grips one end of the center crosspiece 30 via a guide contour 33 of the clamping device 13. The clamping device 13 is positioned against the center crosspiece 30 in such a way that it can be screwed to the adapter 12. This can allow easy mounting of the workpiece holder 10.

Figure 8:
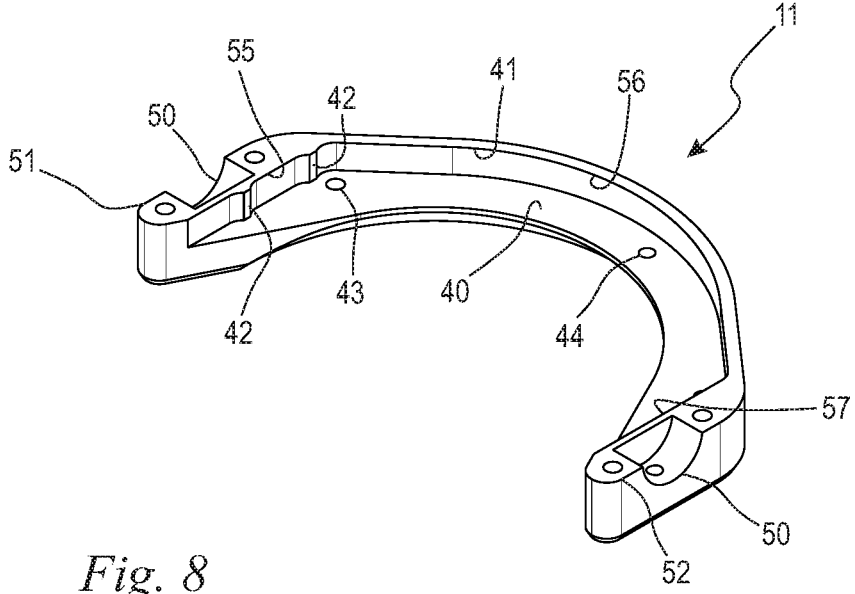
FIG. 8 is a perspective view of the bracket.

FIG. 8 illustrates the bracket 11 of the workpiece holder 10. The bracket 11 has a support surface 40 for contact with the bottom side 61 of the adapter 12. The bracket 11 extends in an arc from a first end 51 to a second end 52. A supporting wall 41 is provided on the support surface 40. The supporting wall 41 is divided into three sections 55, 56, 57. The first section 55 of the supporting wall 41 is formed at the first end 51 of the bracket 11. The third section 57 of the supporting wall 41 is formed at the second end 52 of the bracket 11. The first section 55 and the third section 57 are interconnected by the arc-shaped second section 56. The first section 55 and the third section 57 of the supporting wall 41 are basically in parallel alignment with each other. The supporting wall 41 is preferably aligned perpendicular to the support surface 40. The bracket 11 is preferably made of a metallic material, in particular an aluminum alloy.

As illustrated in FIG. 8, two stops 42 are provided on the first section 55 of the supporting wall 41. The stops 42 are formed as protrusions of the supporting wall 41. It may also be useful to provide the two stops 42 as an alternative on the third section 57 of the supporting wall 41. In the non-swiveled orientation of the workpiece holder 10, the two stops 42 form a limitation of the adapter 12 with respect to the x-degree of freedom. The second section 56 of the supporting wall 41 forms a limitation of the y-degree of freedom for the adapter 12. The support surface 40 represents the limit of the z-degree of freedom. This determines the orientation of the adapter 12 with respect to the bracket 11 in all spatial directions.

To attach the adapter 12 to the bracket 11, the adapter is placed with its bottom side 61 on the support surface 40 of the bracket 11. The adapter 12 has to be pushed against stops 42 of the first section 55 of the supporting wall 41 and against the second section 56 of the supporting wall 41 itself. For additional positional security between the bracket 11 and the adapter 12, a dowel pin is preferably provided that enters into the opening 44 of the bracket 11 and into the opening 29 of the adapter 12. Afterwards, the adapter 12 and the bracket 11 can be screwed together. Through holes 43 are provided on the bracket 11 for this purpose. The adapter 12 is detachably mounted on the bracket 11. In addition, the mounting method ensures sufficient accuracy in the alignment of the adapter 12 and the bracket 11 to eliminate the need to re-align the workpiece holder 10, i.e., to adjust the x and y coordinates of the workpiece holder 10 in the control device 4. Furthermore, the change of different adapters 12 is also possible.

The arc-shaped designs of the bracket 11 and the adapter 12 allow the blank 15 to be machined on its circumferential side. The blank 15 is received in the arc-shaped workpiece holder 10, allowing the milling tool to machine on the circumferential side of the blank 15 without colliding with the workpiece holder 10. The arc-shaped design of the workpiece holder 10 and the swiveling capability of the workpiece holder 10 result in an increase in the effective working space of the dental milling machine 1.

As illustrated in FIG. 3, the workpiece holder 10 is connected to the carrier 20 by two shafts 53. At least one of the two shafts 53 is driven by the electric motor for the swiveling of the workpiece holder 10. As illustrated in FIG. 8, a notch is provided at both the first end 51 and the second end 52 of the bracket 11, forming respective hubs 50 for connection to the shafts 53 of the carrier 20. The hubs 50 are screwed to a supporting element 54 of the carrier 20. Preferably, the bracket 11 is form-fitted to the shafts 53 in a swivel direction 24, such as by means of a tongue-and-groove connection or a cylindrical pin.

As illustrated in FIGS. 4 and 5, in the first state 17 of the adapter 12, all openings and contours of the adapter 12 that are used for alignment and fastening of the bracket 11 and the clamping devices 13 have already been pre-manufactured. Only a contour 35 for receiving a blank 15 (FIG. 6) is not formed in the first state 17 of the adapter 12. This is to be manufactured in the dental milling machine 1 as follows:

The adapter 12 is to be attached to the bracket 11 as described above. Preferably, a variety of different manufacturing programs for completing the adapter 12 are stored in the control device 4. A manufacturing program has to be selected by the operator, which is directed to the corresponding semimanufacture 16 and provides for receiving contour 35 desired by the operator. The manufacturing program has to be started by the operator, whereby the dental milling machine 1 carries out the milling operation on the semimanufacture 16. A receiving contour 35 is now milled on the adapter 12. The receiving contour 35 is milled on the inner side 65 of the adapter 12.

At the end of the milling operation, the adapter 12 has a receiving contour 35 and is thus in its second state 18, as illustrated in FIG. 6. The receiving contour 35 is formed on the inner side 65 of the adapter. The receiving contour 35 is formed by a base wall 37 and a projection 38 formed on the base wall 37. Both the base wall 37 and projection 38 are formed on the inner side 65 of the adapter 12. The base wall 37 extends in a direction from the bottom side 61 to the top side 60 of the adapter 12. The projection 38 is adjacent to the bottom side 61 of the adapter 12. The base wall 37 extends from the adapter 12 to the top side 60 of the adapter 12. In the sample embodiment, the receiving contour 35 is arc-shaped, specifically semi-circle-shaped. This allows circular blanks 15 to be received in the workpiece holder 10. In the preferred embodiment, the projection 38 extends along the entire base wall 37 of the adapter 12, i.e., from the first end face 62 to the second end face 63. It may also be expedient to provide, instead of a single projection 38, multiple projections 38 extending only over sections along the base wall 37 of the adapter 12.

The receiving contour 35 can be adapted to suit almost any wishes of the operator or to the opposite contour of the blank 15 being received. To this end, the corresponding manufacturing program stored in the control device 4 has to be selected. Alternatively, a manufacturing program can also be created by the operator.

Figure 9:
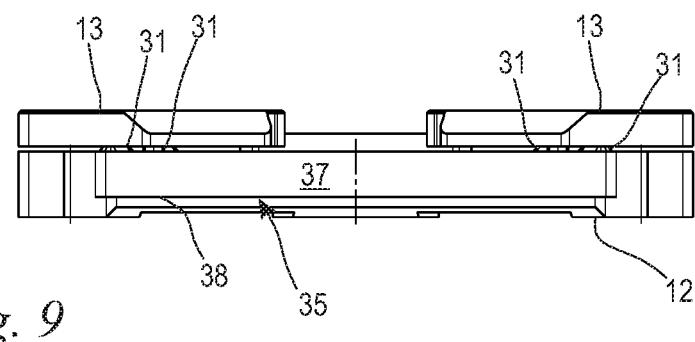
FIG. 9 is a front view of the adapter according to FIG. 6 with clamping devices.
Figure 10:
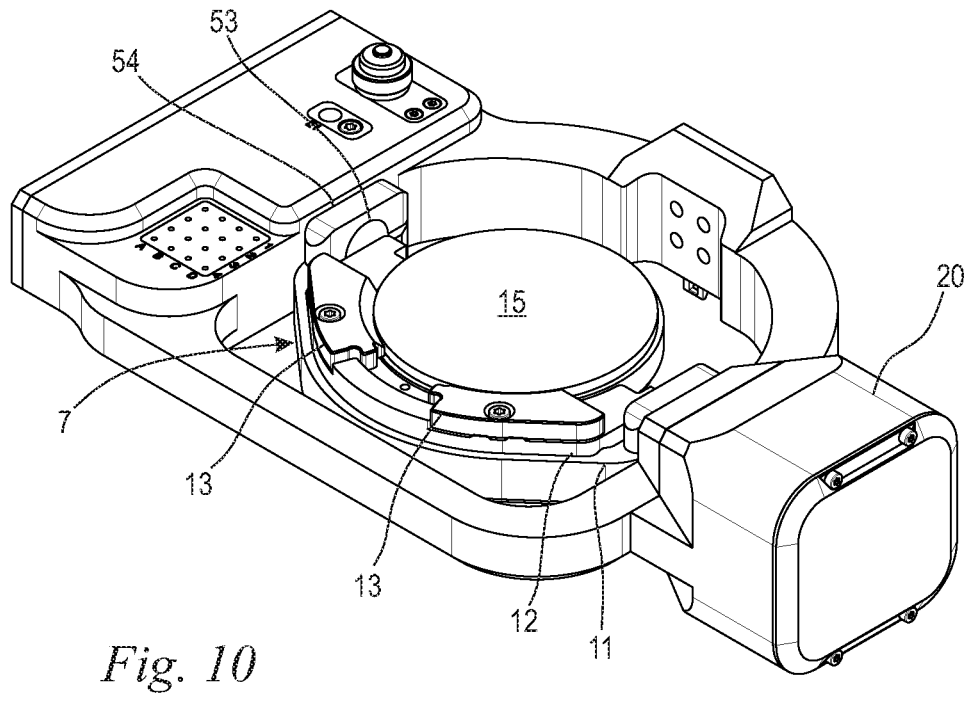
FIG. 10 is a perspective view of an assembly of the carrier and the workpiece holder with a clamped blank.
Figure 11:
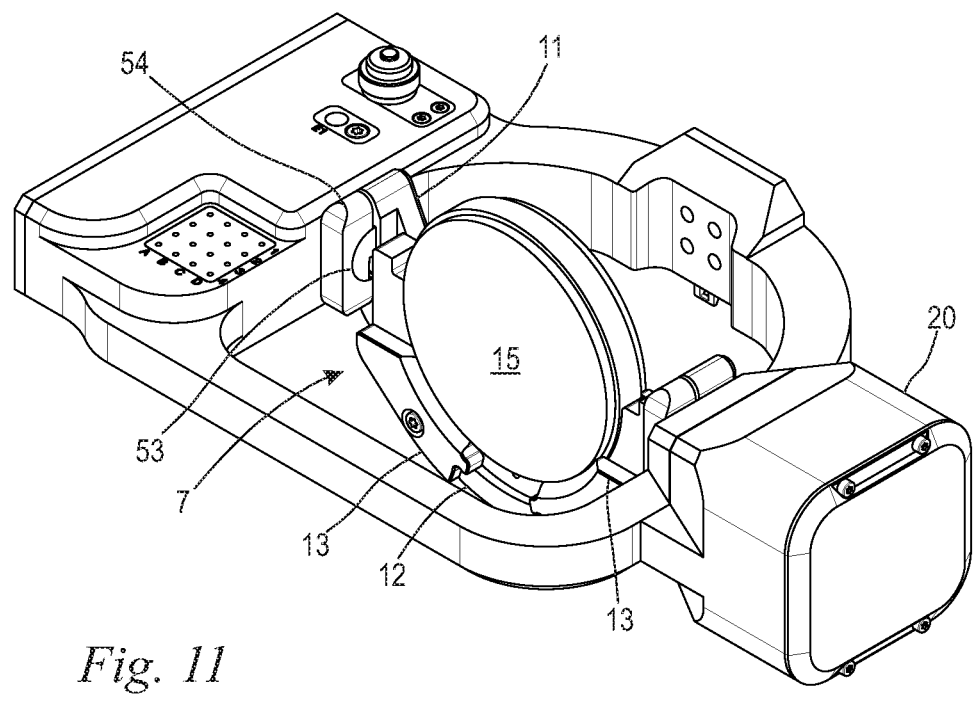
FIG. 11 is a perspective view of an assembly according to FIG. 10 with a swiveled holder.

Finally, the clamping devices 13 have to be screwed onto the top side 60 of the milled adapter 12. The clamping device 13 has a clamping contour 39. The clamping device 13 is arranged on the adapter 12 in such a way that the clamping contour 39 protrudes over the base wall 37 of the adapter 12. For the fastening of the blank 15, it is preferably clamped between the projection 38 of the adapter 12 and the clamping contour 39 of the clamping device 13 while abutting the base wall 37 (FIGS. 10 and 11). This is achieved by tightening the screw connections 14. As can be seen in FIG. 9, the clamping devices 13 are positioned on the positioning elements 31 of the adapter 12. Thereby the contact area between the adapter 12 and the clamping device 13 is reduced, thus ensuring that the clamping forces are conveyed to the blank 15.

Milling the adapter 12 eliminates the need for additional calibration of the dental milling machine 1. The receiving contour 35 for receiving the blank is milled in the adapter 12, which determines the position of the workpiece holder 10 in the dental milling machine 1. Thus, the control device 4 of the dental milling machine 1 knows the exact position of the workpiece holder 10, since this corresponds to the position of the contour programmed for the milling operation.

Figure 12:
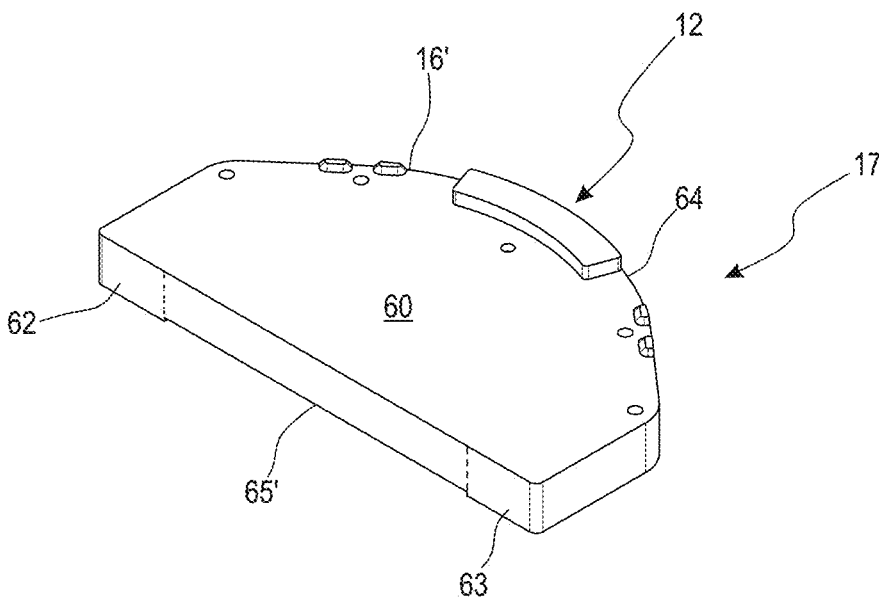
FIG. 12 is a perspective view of an alternative semimanufacture for a workpiece holder.

FIG. 12 illustrates an alternative semimanufacture 16'. According to FIGS. 4 and 5, the alternative semimanufacture 16' differs from the semimanufacture 16 in that the inner side 65' is not arc-shaped like the outer side 64. Rather, the inner side 65' is formed flat. Thus, the first face side 62 merges directly into the inner side 65', which in turn merges into the second face side 63. The advantage of this embodiment of the alternative semimanufacture 16' is that any desired receiving contours 35 can be milled into the alternative semimanufacture 16'. Such receiving contours are not limited to round shapes but can also be polygonal or free-form contours. Naturally, the gain in flexibility with regard to the formation of the receiving contours is accompanied by increased chip removal.

Figure 13:
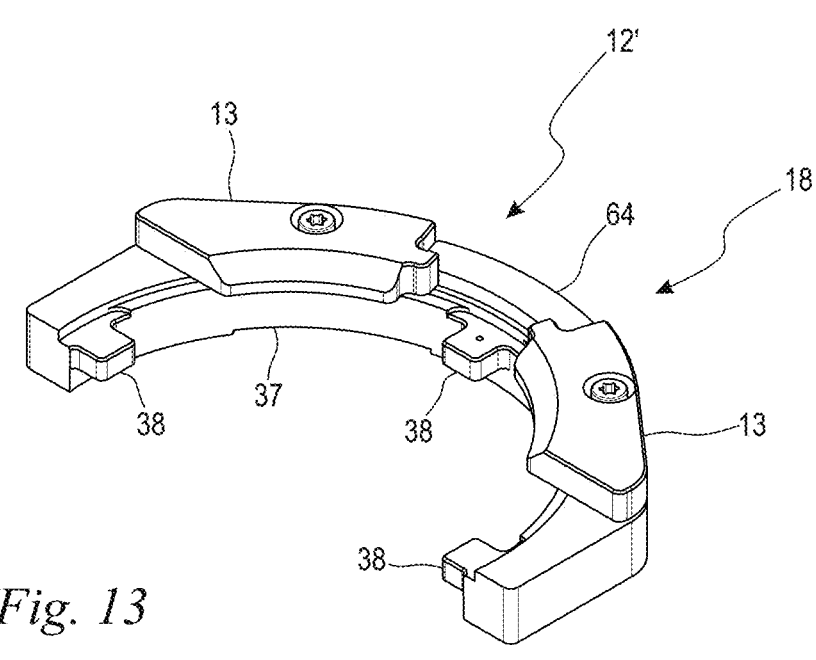
FIG. 13 is a perspective view of an adapter with an alternative mounting geometry with clamping devices.

As illustrated in FIG. 13, a machined shape of the alternative semimanufacture 16' may be an adapter 12' with three individual projections 38 on the base wall 37. The projections 38 are not connected to each other. The projections 38 form a three-point support, ensuring secure attachment of a blank 15 or similar workpiece. Of course, other geometries may also be suitable for the adapter 12.

What is claimed is:

1. A method for setting up a dental milling machine (1), wherein the dental milling machine (1) has a workpiece holder (10),
   wherein the workpiece holder (10) has
   a bracket (11) and
   an adapter (12, 12'), and
   a clamping device (13),
   wherein the adapter (12, 12') is fastened on the bracket (11),
   the method comprising:
   providing the adapter (12, 12') as a semimanufacture (16, 16'); and
   milling the adapter (12, 12') by the dental milling machine (1) such that a receiving contour (35) for receiving a blank (15) is formed on the adapter (12, 12');
   receiving the blank (15) on the adapter (12, 12') in the receiving contour (35);
   clamping the blank (15) against the adapter (12, 12') via the clamping device (13);
   producing a dental prosthesis from the blank (15); and
   removing the dental prosthesis from the adapter (12, 12').

2. The method according to claim 1,
   wherein the step of clamping the blank (15) against the adapter (12, 12') via the clamping device (13) comprises attaching the clamping device (13) to the adapter (12, 12').

3. The method according to claim 1,
   wherein the step of clamping the blank (15) against the adapter (12, 12') via the clamping device (13) comprises attaching the clamping device (13) to the adapter (12, 12') after the adapter (12, 12') has been milled.

4. The method according to claim 1, further comprising:
   holding the blank (15) between the adapter (12, 12') and the clamping device (13) during machining of the blank (15).

5. The method according to claim 1,
   wherein the adapter (12, 12') forms part of the dental milling machine (1).

6. The method according to claim 5,
   wherein the adapter (12, 12') is reusable.

7. The method according to claim 6, further comprising:
   receiving a further blank (15) on the adapter (12, 12') in the receiving contour (35);
   producing a further dental prosthesis from the further blank (15); and
   removing the further dental prosthesis from the adapter (12, 12').

8. The method according to claim 1,
   wherein the dental prosthesis is a dental crown or a dental bridge configured for dental restoration.

* * * * *